United States Patent [19]

Quadir et al.

[11] Patent Number: 5,030,599

[45] Date of Patent: Jul. 9, 1991

[54] SILICON NITRIDE SINTERED MATERIALS

[75] Inventors: Tariq Quadir, Columbia, Md.; Roy W. Rice, Alexandria, Va.

[73] Assignee: W. R. Grace & Co.-Conn., New York, N.Y.

[21] Appl. No.: 555,330

[22] Filed: Jul. 19, 1990

[51] Int. Cl.$^5$ .............................................. C04B 35/58
[52] U.S. Cl. ......................................... 501/98; 501/97
[58] Field of Search .................................... 501/97, 98

[56] References Cited

U.S. PATENT DOCUMENTS

| 4,431,431 | 2/1984 | Sarin et al. | 51/295 |
| 4,433,979 | 2/1984 | Sarin et al. | 51/307 |
| 4,440,547 | 4/1984 | Sarin et al. | 51/295 |
| 4,440,707 | 4/1984 | Shimamori et al. | 264/65 |
| 4,441,894 | 4/1984 | Sarin et al. | 51/295 |
| 4,449,989 | 5/1984 | Sarin et al. | 51/295 |
| 4,497,228 | 2/1985 | Sarin et al. | 51/307 |
| 4,511,402 | 4/1985 | Miura et al. | 501/97 |
| 4,535,063 | 8/1985 | Matsuhiro et al. | 501/97 |
| 4,650,498 | 3/1987 | Buljan | 51/309 |
| 4,795,724 | 1/1989 | Soma et al. | 501/98 |
| 4,801,565 | 1/1989 | Matsui | 501/98 |
| 4,810,678 | 3/1989 | Hirosaki et al. | 501/97 |
| 4,830,800 | 5/1989 | Thomas et al. | 264/65 |
| 4,830,991 | 5/1989 | Matsui | 501/97 |
| 4,904,624 | 2/1990 | Yeckley | 501/97 |

FOREIGN PATENT DOCUMENTS

| 55-051766 | 4/1980 | Japan | 501/97 |
| 59-146980 | 8/1984 | Japan | 501/97 |
| 60-054979 | 3/1985 | Japan | 501/97 |
| 60-131865 | 7/1985 | Japan | 501/97 |
| 60-245739 | 12/1985 | Japan | 501/97 |

OTHER PUBLICATIONS

S. Hampshire and K. H. Jack in "Progress in $N_2$ Ceramics" edited by F. L. Riley, Series E, No. 65 at pp. 225-230.

C. L. Quackenbush and J. T. Smith, GTE Laboratories, Waltham, Mass., "GTE Sintered Silicon Nitride" (ASME 84-GT-228).

Primary Examiner—William R. Dixon, Jr.
Assistant Examiner—Anthony J. Green
Attorney, Agent, or Firm—Steven Capella

[57] ABSTRACT

A sintered silicon nitride product is made having a high flexural strength by sintering a mixture of silicon nitride and a sintering aid containing alumina and at least a three component rare earth oxide mixture which does not contain yttria. Based on the weight of the final sintered nitride product, the three component rare earth oxide mixture comprises about 3 to 6% $La_2O_3$, 2 to 5% $Nd_2O_3$, and 1 to 4 $CeO_2$. An additional fourth component, $Pr_6O_{11}$, can be added in an amount of 0.5 to 1.1%.

11 Claims, No Drawings

SILICON NITRIDE SINTERED MATERIALS

BACKGROUND OF THE INVENTION

1. Field of the Invention

This invention relates to sintering agents to be used with silicon nitride to produce a sintered product having a refractory oxide phase with good strength at low cost.

2. Description of the Previously Published Art

Sintering agents are typically necessary to permit the silicon nitride particles to sinter together to form a dense material.

GTE Laboratories in U.S. Pat. Nos. 4,431,431; 4,433,979; 4,440,547; 4,441,894; 4,449,989; 4,497,228; and 4,650,498 disclose densified composite ceramic articles where there are two phases of silicon nitride with a second phase having a densification aid of the oxides of silicon, aluminum, magnesium, zirconium, yttrium, hafnium, cerium, and the lanthanide rare earths.

U.S. Pat. No. 4,440,707 discloses a silicon nitride product sintered one or more components of AlN, $Al_2O_3$, $SiO_2$ and oxides of rare earth aids.

U.S. Pat. No. 4,511,402 discloses a silicon nitride sintered body having 0.1-15% by weight of one or more chromium components and 1 to 25% by weight of one or more oxides of Sc, Y, Al, Zr and Si.

U.S. Pat. No. 4,535,063 discloses a silicon nitride sintered body containing specific amounts of oxides or oxynitrides of Sr, Mg, a rare earth element and Zr with the remainder being $Si_3N_4$.

U.S. Pat. No. 4,795,724 discloses silicon nitride sintered bodies having a sintering aid which has at least two rare earth elements from the group Y, Er, Tm, Yb and Lu. In most of the examples the expensive element Y is present in substantial amounts. Examples without Y have combinations of Er and Yb or Yb and Lu.

U.S. Pat. No. 4,801,565 discloses a silicon nitride sintered body containing at least an oxide of a rare earth element and $ZrO_2$.

U.S. Pat. No. 4,810,678 discloses a silicon nitride base sintered body where the sintering aid is $Y_2O_3$ in combination with $Nd_2O_3$ and/or $Sm_2O_3$. Substantial amounts of expensive $Y_2O_3$ are used and most of the examples illustrate a two component sintering aid of $Y_2O_3$ and $Nd_2O_3$.

U.S. Pat. No. 4,830,800 discloses a dense silicon nitride compact having $Al_2O_3$ or AlN, and a rare earth oxide or a rare earth nitride. The preferred rare earth appears to be Y.

U.S. Pat. No. 4,830,991 discloses a silicon nitride sintered body containing an intergranular phase being substantially crystallized into diopside structural type crystals and apatite structure type crystals. A composition including Ca, Y, a rare earth element, Mg, Fe, Ni and/or Al is formulated into a $Si_3N_4$ raw material.

3. Objects of the Invention

It is an object of this invention to obtain high sintered densities of silicon nitride without employing the commonly used expensive additive $Y_2O_3$.

It is a further object of this invention to obtain flexural (4 point) properties of 80 Ksi and above.

It is a further object of this invention to obtain sintered high density silicon nitride products.

It is a further object of this invention to obtain a refractory product which is believed to have high melting rare earth silicate phases.

It is a further object of this invention to obtain an alpha to beta conversion of higher than 75% in the absence of yttria and preferably higher than 80%.

These and further objects will become apparent as the description of the invention proceeds.

SUMMARY OF THE INVENTION

A sintered silicon nitride product is formed by sintering a mixture of silicon nitride and a sintering aid containing alumina and a unique three or four component rare earth oxide mixture. This rare earth oxide mixture does not contain the conventionally used expensive yttria. Instead, it contains the oxides of La, Nd, Ce and optionally Pr. Based on the weight of the sintered nitride product, the range of the oxides for the three component mixture are:

(a) 3 to 6% $La_2O_3$
(b) 2 to 5% $Nd_2O_3$
(c) 1 to 4% $CeO_2$.

For the four component mixture the range of oxides are:

(a) 4 to 6% $La_2O_3$;
(b) 2 to 3.6% $Nd_2O_3$;
(c) 1.2 to 2.0% $CeO_2$; and
(d) 0.5 to 1.1% $Pr_6O_{11}$.

DESCRIPTION OF THE PREFERRED EMBODIMENTS

The sintering aid according to this invention which is used to sinter silicon nitride does not contain any expensive yttria. Instead it is made of a three or four component rare earth oxide mixture which is added to the silicon nitride and alumina mixture to be sintered in the following amounts based on the total weight of the silicon nitride product to be sintered. In the case of the three component embodiment, the lanthanum oxide, $La_2O_3$, is present from about 3 to 6 wt %; the neodymium oxide, $Nd_2O_3$, is present from about 2 to 5 wt %; and the cerium oxide, $CeO_2$, is present from 1 to 4 wt %. In the case of the four component embodiment $La_2O_3$ is present from about 4 to 6 wt %; $Nd_2O_3$ is present from about 2 to 3.6 wt %; $CeO_2$ is present from 1.2 to 2.0 wt %; and the praseodymium oxide, $Pr_6O_{11}$, is present from 0.5 to 1.1 wt %.

The rare earth powder mixture can be obtained by mixing together either the three separate oxides or the four separate oxides in the desired amounts. From the numeric ranges above the amount of the three component additive is from about 6 to 15 wt. % and the amount of the four component additive is from about 7.7 to 12.7 wt %. Generally, the four rare earth additions of about 7-13 wt % are preferred with a more preferred target level being 10 wt %.

In addition to making up the rare earth mixture from the four separate components, it is possible to obtain the four components in the desired relative ratios from the Davison Chemical Company as Didy Carbonate. The elements are in their carbonate form. When they are calcined to their oxide form, they have the following relative weight ratios on the smallest component, $Pr_6O_{11}$, expressed as 1.0:

| | |
|---|---|
| $La_2O_3$ | 4.2–4.6 |
| $Nd_2O_3$ | 3.1–3.5 |
| $CeO_2$ | 1.2–2.0 |

-continued

| | |
|---|---|
| $Pr_6O_{11}$ | 1.0 |

The calcined Didy Carbonate also has small trace amounts of $Sm_2O_3$, $Y_2O_3$ (about 0.1%) and $Gd_2O_3$.

Although the exact mechanism of the sintering is not known, the following may assist in understanding the role which the various components are believed to perform.

S. Hampshire and K. H. Jack in "Progress in $N_2$ Ceramics" edited by F. L. Riley, Series E, No. 65 at pages 225-230, show that a commonly used sintering additive for silicon nitride is a combination of $MgO$-$Y_2O_3$-$Al_2O_3$. Similarly, C. L. Quackenbush and J. T. Smith of GTE Laboratories in Waltham, Mass. published "GTE Sintered Silicon Nitride" (ASME 84-GT-228) which shows $Y_2O_3$-$Al_2O_3$ as an additive. The MgO and $Al_2O_3$ are believed to form at low temperatures a liquid phase with surface silica of the silicon nitride particle. This liquid phase has lower viscosity and hence it facilitates rearrangement among particles which in turn promotes densification. On the other hand, $Y_2O_3$ is known to facilitate alpha to beta phase transformation of the silicon nitride at lower temperatures and it also forms a high viscosity liquid phase with the surface silica, hence the densification is retarded. Therefore, a combination of $Al_2O_3$ and $Y_2O_3$ or $Al_2O_3$, $Y_2O_3$ and MgO defines a complete system wherein densification and transformation of the alpha to beta phase is accomplished. Alpha to beta phase transformation can be important because it leads to the production of beta phase which is believed to increase the densification and it is microstructurally important to enhance the fracture toughness.

In the present system the expensive $Y_2O_3$ is not used. It is believed that the $Al_2O_3$, $Nd_2O_3$ and possibly $Pr_6O_{11}$ facilitate densification by forming a low viscosity liquid phase with the surface silica while the $CeO_2$ and $La_2O_3$ help the alpha to beta phase transformation. $CeO_2$ behaves in a similar fashion as $Y_2O_3$ since it is believed to increase the viscosity of the liquid phase. At least three of the non-$Y_2O_3$ rare earth oxide components (La, Nd, and Ce) are believed necessary when one attempts to sinter the silicon nitride without using $Y_2O_3$ and a fourth rare earth oxide component, $Pr_6O_{11}$, can also be advantageously used.

The mixtures can be processed by either dry milling or wet milling to thoroughly blend the materials. Dry milling is done in a high alumina content mill jar with a high alumina content milling media in the form of ¾ inch diameter balls. The silicon nitride powder and the additives are added to the mill along with a milling aid Thixcin R TM made by N. L. Industries and a binder Carbowax 20M having a molecular weight of about 20,000. The concentration of Thixcin R and Carbowax 20M is each preferably about 1 weight %.

The milled powder is sieved through a 100 mesh and later used to make MOR bars. I5 The other processing method is wet milling. In this process a slurry with 50 wt % solids and liquid (water) is made. Water is a preferred liquid because of cost, safety and environmental issues, but milling times should be limited to about 3 hours to limit hydration of the silicon nitride powder. The dispersant used is Darvan 821A from R. T. Vanderbilt. The milling is done for 1-3 hours depending on the particle size. Fifteen minutes before removing the slurry from the mill, a binder system of PVA and PEG 400 is added. The slurry is then spray dried at 200° C. inlet temperature.

Alumina can be added in an amount of about 3-7 wt % 5 wt % representing a typical effective value. The alumina assists in densification and may aid in a crystallization of the glassy phase.

To test the physical properties of the sintered compositions, the material is formed into bars. These bars having a size of ¼ inch×⅜ inch×2 inch and are pressed and sintered in a Vacuum Industries furnace at 1760° C. for 2 hrs. The sintered bars are then surface finished using a 320 grit wheel on all four sides. The ground bars are tested in 4 point flexural test fixture for flexural strength. The specimens/bars were tested under the following conditions:

Span:
  Inner=20 mm
  Outer=40 mm
Cross head speed: 0.02 in/min.
Width of the bar (approx.)=0.19 inch
Thickness of the bar (approx.)=0.11 inch
Machine: Instron.
Environment: Room temperature, in air Under this test, it is desirable to obtain strength values of 80 Ksi and above. Strength values of at least 85 ksi are obtained as well as even greater than 88 ksi.

Since it is an object of this invention to obtain high density products, any resulting product which is porous is undesirable because the product will not be dense and thus limiting strength due to the general inverse relationship between strength and porosity.

The fracture toughness was measured by an indentation technique at a load of 20 kg. Fracture toughness values of 6 $Mpam^{\frac{1}{2}}$ or higher are desirable.

Having described the basic aspects of our invention, the following examples are given to illustrate specific embodiments thereof.

EXAMPLE 1

This example illustrates sintered silicon nitride products according to the present invention where a four component rare earth oxide mixture is used.

A rare earth oxide mixture was obtained in the carbonate form from the Davison Chemical Company as Didy Carbonate. The relative weight concentrations of the rare earth oxides based on the smallest component, $Pr_6O_{11}$ expressed as 1.0:

| | |
|---|---|
| $La_2O_3$ | 4.2-4.6 |
| $Nd_2O_3$ | 3.1-3.5 |
| $CeO_2$ | 1.2-2.0 |
| $Pr_6O_{11}$ | 1.0 |

The carbonates were calcined at 950°-1000° C. for 2 hours to convert the rare earth carbonates to the oxide form. The rare earth oxide is mixed with alumina and silicon nitride powders from Elkem. The mixture is dry processed by milling for about 10 hours. Alumina was added in about 5 wt % concentration because of its advantageous effect on densification. The material was sintered at 1760° C. for two hours at 0.1 MPa nitrogen pressure. The composition of the sintering rare earth mixture is given in Table 1 below as well as the resulting strength value for the 5 to 6 bars which were made and tested for strength.

TABLE 1

| Exp. No. | La$_2$O$_3$ | Nd$_2$O$_3$ | CeO$_2$ | Pr$_6$O$_{11}$ | Sm$_2$O$_3$ | Y$_2$O$_3$ | Gd$_2$O$_3$ | Al$_2$O$_3$ | Sintering Temp °C. | MOR (Ksi) |
|---|---|---|---|---|---|---|---|---|---|---|
| | | | | wt % | | | | | | |
| 1 | 4.31 | 3.21 | 1.48 | 0.95 | 0.02 | 0.01 | 0.01 | 5 | 1760 | 85-90 |

These MOR values of greater than 80 Ksi show very good flexural strength. The product also had a high fracture toughness of 6.2 Mpam$^{\frac{1}{2}}$.

EXAMPLES 2-4

These examples further illustrate sintered silicon nitride products according to the invention where the four component rare earth oxide mixture, without any additional trace amounts of other rare earths, is used.

A rare earth oxide mixture was made by using a combination of four separate rare earth oxides obtained from Aesar Chemicals. For Example 2, the composition was essentially the same as in Example 1, but without the added trace rare earth oxides. For Examples 3 and 4, the amount of Pr$_6$O$_{11}$ was reduced and the amount of CeO$_2$ was increased. A lower sintering temperature was used in Example 3 of 1700° C. and in Example 4 the conventional higher sintering temperature of 760° C. was used for 2 hours.

These four component rare earth oxide mixtures were mixed with silicon nitride powder, milled for 10 hours and then 5 wt % alumina was added. The rare earth oxide compositions are given in Table 2 below as well as the resulting strength values for 5 to 6 bars which were made and tested for each example.

TABLE 2

| Example No. | La$_2$O$_3$ | Nd$_2$O$_3$ | CeO$_2$ | Pr$_6$O$_{11}$ | Al$_2$O$_3$ | Sintering Temp °C. | MOR (Ksi) |
|---|---|---|---|---|---|---|---|
| 2 | 4.31 | 3.21 | 1.48 | 1 | 5 | 1760 | 80 |
| 3 | 4.31 | 3.21 | 2.0 | 0.5 | 5 | 1700 | 82 |
| 4 | 4.31 | 3.21 | 2.0 | 0.5 | 5 | 1760 | 90 |

These results show that the trace amounts of additional rare earth oxides present in the composition of Example 1 are not required to obtain high strength sintered silicon nitride. The key requirement is the synergistic interaction of the specified four rare earth oxides.

EXAMPLE 5

This example illustrates a silicon nitride product made according to the present invention with only three rare earth oxide components.

A rare earth oxide mixture was made by using a combination of three separate rare earth oxides obtained from Aesar Chemicals. The three component rare earth oxide mixture was mixed with silicon nitride powder, milled for 10 hours and then 5 wt % alumina was added. The rare earth oxide composition is given in Table 3 below as well as the resulting strength values for 10 bars which were made and tested after being sintered at a sintering temperature of 760° C. for 2 hours.

TABLE 3

| Example No. | La$_2$O$_3$ | Nd$_2$O$_3$ | CeO$_2$ | Al$_2$O$_3$ | Sintering Temp °C. | MOR (Ksi) |
|---|---|---|---|---|---|---|
| 5 | 4.56 | 3.40 | 2.12 | 5 | 1760 | 87 |

These results show that the three component rare earth oxide mixture produces a high strength sintered silicon nitride product.

COMPARISON EXAMPLES 6-8

The procedure of Example 1 was followed using the composition of Example 1 except that the total amount of the rare earth oxide mixture was varied. The results are set forth in Table 4. The table omits reporting the minor amounts of Sm$_2$O$_3$, Y$_2$O$_3$ and Gd$_2$O$_3$. The results show that unsatisfactory results were obtained because the MOR values are less than 80.

TABLE 4

| Exp. No. | La$_2$O$_3$ | Nd$_2$O$_3$ | CeO$_2$ | Pr$_6$O$_{11}$ | Total RE Oxide | Al$_2$O$_3$ | Sintering Temp °C. | MOR (Ksi) |
|---|---|---|---|---|---|---|---|---|
| 6 | 2.57 | 1.91 | 0.9 | 0.57 | 5.88 | 5 | 1760 | 74 |
| 7 | 3.44 | 2.56 | 1.19 | 0.76 | 7.95 | 5 | 1760 | 74.2 |
| 8 | 5.6 | 4.17 | 1.92 | 1.23 | 12.92 | 5 | 1760 | 72 |

This data illustrates that there is an optimum amount of the rare earth oxide mixture to be added to the silicon nitride and that adding more or less does not produce optimum strength results.

COMPARISON EXAMPLES 9-17

Using the procedure of Example 2 where separate rare earth oxides are mixed together, various 4-component mixtures were made for Examples 9-11 and 2-component mixtures were made for Examples 12-17. The compositions are set forth in Table 5 along with their strengths or an indication that they were porous and thus not of the high density desired.

TABLE 5

| Example No. | La$_2$O$_3$ | Nd$_2$O$_3$ | CeO$_2$ | Pr$_6$O$_{11}$ | Al$_2$O$_3$ | Sintering Temp °C. | MOR (Ksi) |
|---|---|---|---|---|---|---|---|
| 9 | 5.0 | 2.5 | 1.0 | 1.5 | 5 | 1760 | 66 |
| 10 | 1.0 | 3.0 | 1.0 | 5.0 | 5 | 1760 | 65 |
| 11 | 2.0 | 2.0 | 2.0 | 4.0 | 5 | 1760 | Porous |
| 12 | — | 3.0 | — | 7.0 | 5 | 1760 | Porous |
| 13 | 3.0 | — | — | 7.0 | 5 | 1760 | Porous |

TABLE 5-continued

| Example No. | La$_2$O$_3$ | Nd$_2$O$_3$ | CeO$_2$ | Pr$_6$O$_{11}$ | Al$_2$O$_3$ | Sintering Temp °C. | MOR (Ksi) |
|---|---|---|---|---|---|---|---|
| 14 | — | — | 3.0 | 7.0 | 5 | 1760 | Porous |
| 15 | 6.4 | — | 3.6 | — | 5 | 1760 | 73 |
| 16 | 4.5 | 5.6 | — | — | 5 | 1760 | 57 |
| 17 | — | 5.6 | 4.4 | — | 5 | 1760 | 76 |

These examples illustrate that if the four components are not present in the required ratios or that if the required three components of La, Nd and Ce are not used, the optimum, dense strength sintered products of the present invention are not obtained.

It is understood that the foregoing detailed description is given merely by way of illustration and that many variations may be made therein without departing from the spirit of this invention.

What is claimed is:

1. A sintered silicon nitride product formed by sintering a mixture consisting essentially of silicon nitride and a sintering aid consisting essentially of alumina and a three component rare earth oxide mixture consisting essentially of about:
   (a) 3 to 6% La$_2$O$_3$;
   (b) 2 to 5% Nd$_2$O$_3$; and
   (c) 1 to 4% CeO$_2$
said percentages being based on the weight of the silicon nitride product.

2. A sintered silicon nitride product formed by sintering a mixture consisting essentially of silicon nitride and a sintering aid consisting essentially of alumina and a four component rare earth oxide mixture consisting essentially of about:
   (a) 4 to 6% La$_2$O$_3$;
   (b) 2 to 3.6% Nd$_2$O$_3$;
   (c) 1.2 to 2.0% CeO$_2$; and
   (d) 0.5 to 1.1% Pr$_6$O$_{11}$,
said percentages being based on the weight of the silicon nitride product.

3. A sintered silicon nitride product according to claim 2, wherein the four component rare earth oxide product comprises about 10% by weight of the sintered silicon nitride product.

4. A sintered silicon nitride product according to claim 1, wherein the amount of alumina is about 3-7 weight %.

5. A sintered silicon nitride product according to claim 2, wherein the amount of alumina is about 3-7 weight %.

6. A sintered silicon nitride product according to claim 3, wherein the amount of alumina is about 5 weight %.

7. A sintered silicon nitride product according to claim 1, wherein the 4 point MOR flexural strength is at least 85 Ksi.

8. A sintered silicon nitride product according to claim 7, wherein the 4 point MOR flexural strength is at least 88 Ksi.

9. A sintered silicon nitride product according to claim 2, wherein the 4 point MOR flexural strength is at least 85 Ksi.

10. A sintered silicon nitride product according to claim 9, wherein the 4 point MOR flexural strength is at least 88Ksi.

11. A sintered silicon nitride product according to claim 2, wherein the four component rare earth oxide product contains the oxides in the relative weight ratio of about

| | |
|---|---|
| La$_2$O$_3$ | 4.2–4.6 |
| Nd$_2$O$_3$ | 3.1–3.5 |
| CeO$_2$ | 1.2–2.0 |
| Pr$_6$O$_{11}$ | 1.0 |

* * * * *